US011459418B2

(12) United States Patent
Ren et al.

(10) Patent No.: US 11,459,418 B2
(45) Date of Patent: Oct. 4, 2022

(54) QUADRIPOLYMER BASED ON HOST-GUEST INTERACTION AND PREPARATION PROCESS THEREOF

(71) Applicant: SOUTHWEST PETROLEUM UNIVERSITY, Sichuan (CN)

(72) Inventors: Qiang Ren, Sichuan (CN); Yongming Li, Sichuan (CN); Youshi Jiang, Sichuan (CN)

(73) Assignee: SOUTHWEST PETROLEUM UNIVERSITY, Sichuan (CN)

( * ) Notice: Subject to any disclaimer, the term of this patent is extended or adjusted under 35 U.S.C. 154(b) by 325 days.

(21) Appl. No.: 16/622,840

(22) PCT Filed: Nov. 20, 2018

(86) PCT No.: PCT/CN2018/116450
§ 371 (c)(1),
(2) Date: Dec. 13, 2019

(87) PCT Pub. No.: WO2020/093445
PCT Pub. Date: May 14, 2020

(65) Prior Publication Data
US 2020/0332043 A1    Oct. 22, 2020

(30) Foreign Application Priority Data
Nov. 9, 2018    (CN) .......................... 201811334478.2

(51) Int. Cl.
| | | |
|---|---|---|
| *C08F 220/06* | (2006.01) | |
| *C08F 220/56* | (2006.01) | |
| *C08F 290/04* | (2006.01) | |
| *C08K 5/07* | (2006.01) | |
| *C09K 8/588* | (2006.01) | |

(52) U.S. Cl.
CPC ........ *C08F 290/046* (2013.01); *C08F 220/06* (2013.01); *C08F 220/56* (2013.01); *C08K 5/07* (2013.01); *C09K 8/588* (2013.01)

(58) Field of Classification Search
CPC .... C08F 220/06; C08F 220/54; C08F 220/56; C08F 290/046; C08F 290/02
See application file for complete search history.

(56) References Cited

FOREIGN PATENT DOCUMENTS

| | | |
|---|---|---|
| CN | 101104665 A | 1/2008 |
| CN | 103937482 A | 7/2014 |
| CN | 104804149 A | 7/2015 |
| CN | 105859959 A | 8/2016 |
| CN | 107304240 A | 10/2017 |
| CN | 107459604 A | 12/2017 |

OTHER PUBLICATIONS

Pu et al; Royal Society of Chemistry; 2016, vol. 6; pp. 96006-96014. (Year: 2016).*
He et al; Colloid Polymer Sci; 2014; vol. 292; pp. 1725-1733. (Year: 2014).*
Tang et al; Carbohydrate Polymers; 240 (2020), pp. 1-22 (Year: 2020).*
Hu et al; Colloids and surfaces A, 548 (2018) pp. 10-18 (Year: 2018).*
Peng et al; New Journal of Chemistry; 2019, 43, pp. 5363-5373 (Year: 2019).*
Ren et al; Polymer Sci. Eng., 2020, 60; pp. 2581-2592 (Year: 2020).*
He et al; Polymer Sci, ser. B, 2014, vol. 56, pp. 822-829 (Year: 2014).*

* cited by examiner

*Primary Examiner* — Karuna P Reddy
(74) *Attorney, Agent, or Firm* — Muncy, Geissler, Olds & Lowe, P.C.

(57) ABSTRACT

A quadripolymer based on host-guest interaction and prepared in the steps including (1) weigh maleic anhydride and dissolve in dichloromethane, add β-phenethylamine dropwise, stir to react for 1 to 3 hours, perform extraction filtration and washing, to obtain N-phenethylmaleamic acid; (2) weigh mono 6-ethylenediamine β-cyclodextrin and maleic anhydride, dissolve in N, N-dimethylformamide, and place at 40° C. for reaction for 3 to 6 hours, the product is precipitated with chloroform, washed and dried under vacuum to obtain maleic anhydride modified mono 6-ethylenediamine β-cyclodextrin; (3) Add acrylamide, acrylic acid, maleic anhydride modified mono 6-ethylenediamine β-cyclodextrin, N-phenethylmaleamic acid, adjust the pH of the solution to 7; introduce nitrogen, add a photoinitiator and place to a photo-initiating device to react 3~5 hours at a temperature of 10~30° C. The quadripolymer has good temperature and salt resistance, shear resistance. The raw materials are cheap and easily available. The reaction conditions are mild.

3 Claims, 4 Drawing Sheets

QUADRIPOLYMER BASED ON HOST-GUEST INTERACTION AND PREPARATION PROCESS THEREOF

TECHNICAL FIELD

The present invention relates to a quadripolymer based on host-guest interaction for improving the oil recovery of an oil field and preparation process thereof. It belongs to the field of oilfield chemistry.

BACKGROUND ART

The polymer flooding technology is an important technology for chemical flooding in tertiary oil recovery of an oilfield. Its mechanism is clear and the technology is relatively simple. By adding a polymer to the water phase to enhance the viscosity of the water phase, so as to achieve fluidity control, increase the spreading efficiency and enhance the oil recovery. Polyacrylamide (PAM) and partially hydrolyzed polyacrylamide (HPAM) are currently the most widely used polymer flooding agents in oilfields. However, its solution viscosity is very sensitive to temperature and water mineralization, and its viscosity retention rate is very low under extreme conditions of high temperature and high salinity, so it is unable to achieve the goal of "water control and oil stabilization" and "water control and oil increase" under severe reservoir conditions.

Currently, the main way to improve polymer performance is to introduce functional monomers. For example, the introduction of a small number of hydrophobic groups into the polyacrylamide molecular chain can improve the viscosity and salt resistance of the polymer, but the polymer solubility becomes poor; and under a high temperature and high salt reservoir condition, the viscosity of the hydrophobically associating polymer solution decreases dramatically, affecting the production of oilfields (Jiang Feng. Synthesis of temperature-resistant and salt-resistant hydrophobic associative polymer and evaluation of oil displacement performance [D] Southwest Petroleum University, 2015; Ye Z, Jiang J, Zhang X, et al. Synthesis and characterizations of hydrophobically associating water-soluble polymer with nonionic surfmer [J]. Journal of Applied Polymer Science, 2016, 133 (11)). The introduction of rigid groups (such as benzene rings, pyridine rings, etc.) on the polymer molecular chain can increase the rigidity of the polymer molecular chains, thereby improving the temperature and salt resistance of the polymer, but the polymer has poor tackifying performance (Wang Xiaoli, Synthesis and Characterization of Polyacrylamide Hydrophobic Associative Polymers [D]. Shandong University, 2015).

The hydrophobic cavity of β-cyclodextrin has relatively low polarity and can contain guest organic molecules. Intermolecular forces, such as hydrophobic interaction forces, van der Waals forces, hydrogen bonds, and Coulomb forces, exist between β-cyclodextrin and the guest molecules, which can be used to effectively build polymer networks to improve polymer performance. Therefore, β-cyclodextrin is increasingly used in oilfield chemistry, especially in oil displacement polymers. CN106117440A discloses a fluorine-containing water-soluble hyperbranched polymer oil displacing agent. The oil displacing agent uses a polycyclodextrin containing a hydroxyl group at a terminal group as a core, and the acrylamide-sodium acrylate random copolymer segment, polyfluorinated hydrophobic segment and polyamphoteric hydrophobic functional segment are linked to form copolymer arm, which has better tackifying and shear resistance properties than ordinary polyacrylamide polymers. CN102898590A discloses a β-cyclodextrin-containing twin-tailed hydrophobically associative polymer oil flooding agent and a synthetic method thereof. The oil flooding agent is copolymerized by the twin-tailed hydrophobic monomers N-allyl-N-dodecyl oleamide, acrylamide, acrylic acid, 2-O-(allyloxy-2-hydroxypropyl)-β-cyclodextrin, which has good temperature and salt resistance properties and can improve the oil recovery by 10%.

As many oilfields in China enter the later stage of development, there will be more and more special reservoirs, especially high temperature and high salt reservoirs, which will become the main parts of chemical flooding. Therefore, the development of highly efficient temperature and salt resistant polymers has become an urgent issue to be solved.

SUMMARY OF THE INVENTION

An object of the present invention is to provide a quadripolymer based on host-guest interaction, the quadripolymer has good temperature and salt resistance and shear resistance, which meets the needs for high-temperature and high-salt oilfield mining and is expected to be widely used in major oilfields throughout the country.

Another object of the present invention is to provide a preparation process of the quadripolymer based on host-guest interaction. The method is reliable in principle, simple in operation, cheap in raw materials and readily available. Its reaction conditions are mild, having broad market application prospects.

In order to achieve the object, the present invention adopts the following technical solutions.

A quadripolymer based on host-guest interaction, having the following structural formula:

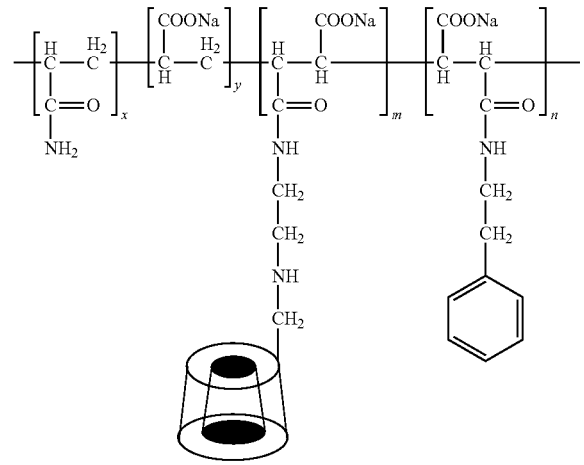

Where, x, y, m, and n are the polymerization degrees of monomers, x is 70 to 80%, y is 15 to 25%, n is 0.01 to 0.5%, and m=1−x−y−n.

A process for preparing the quadripolymer based on host-guest interaction, comprising the following steps in sequence:

(1) Synthesis of N-phenethylmaleamic acid:

Weigh a certain amount of maleic anhydride and dissolve it in dichloromethane; at room temperature, slowly add an equimolar amount of β-phenethylamine to the maleic anhydride solution dropwise; continue to stir to react for 1 to 3 hours after addition; after the reaction, perform extraction filtration to get a white solid, which is thoroughly washed with anhydrous ether and dried under vacuum at 50° C. to obtain N-phenethylmaleamic acid (PEMA).

(2) Synthesis of maleic anhydride modified mono 6-ethylenediamine β-cyclodextrin:

Weigh a certain amount of mono 6-ethylenediamine β-cyclodextrin (EDA-β-CD) and maleic anhydride (MAH) (molar ratio of 1:1.1-1:1.3), dissolve in N, N-dimethylformamide, and place at a constant temperature of 40° C. for reaction for 3 to 6 hours. After the reaction is completed, the reaction solution is cooled to room temperature and the product is precipitated with chloroform. The mixture is thoroughly washed with a mixed solution of acetone and distilled water (volume ratio of 10:1), then dried under vacuum at 50° C. to obtain maleic anhydride modified mono 6-ethylenediamine β-cyclodextrin (MAH-EDA-β-CD).

(3) Synthesis of quadripolymer based on host-guest interaction:

Add a certain amount of acrylamide (AM), acrylic acid (AA), maleic anhydride modified mono 6-ethylenediamine β-cyclodextrin (MAH-EDA-β-CD), N-phenethylmaleamic acid (PEMA) in distilled water, of which the AM mass fraction is 15-25%, AA mass fraction is 4-5%, MAH-EDA-β-CD mass fraction is 0.05-0.5%, PEMA mass fraction is 0.2-0.5%; adjust the pH of the solution to 7 with sodium hydroxide, stir until the solution is clear and transparent; introduce nitrogen for 15 minutes to remove the dissolved oxygen in the water; add a photoinitiator AIBA or 2-hydroxy-4'-(2-hydroxyethoxy)-2-methylphenylacetone and place to a photo-initiating device to react 3-5 hours at a temperature of 10-30° C., to obtain a white colloid, that is, quadripolymer based on host-guest interaction.

Compared with prior art, the present invention has the following beneficial effects: (1) both (β-cyclodextrin and benzene ring structure can enhance the rigidity of the polymer molecular chain, so that the polymer has strong temperature resistance, salt resistance and shear resistance; (2) it can form a host-guest function with β-cyclodextrin as the host and the benzene ring as the guest, further improving the temperature resistance, salt resistance and shear resistance of the polymer; (3) N-sodium phenethylmaleamate is soluble in water, which makes the polymerization conditions more convenient. The preparation process of copolymer flooding agent is relatively simple, the reaction conditions are mild; therefore, it has broad market application prospects.

DETAILED DESCRIPTION OF THE PREFERRED EMBODIMENTS

Figure 1:
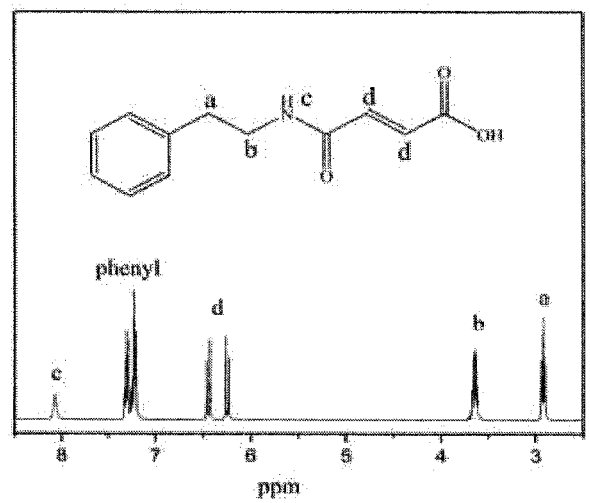
FIG. 1 shows the NMR spectrum of N-phenethylmaleamic acid.

The present invention is further described in conjunction with the accompanying drawings and embodiments.

I. Preparation of quadripolymer based on host-guest interaction

Embodiment 1

Weigh 5 g of maleic anhydride and dissolve it in 100 mL of dichloromethane; at room temperature, slowly add an equimolar amount of β-phenethylamine to the maleic anhydride solution dropwise; continue to stir to react for 2 hours after addition; after the reaction, perform extraction filtration to get a white solid, which is thoroughly washed with anhydrous ether and dried under vacuum at 50° C. to obtain N-phenethylmaleamic acid (PEMA).

Weigh 5 g of mono 6-ethylenediamine β-cyclodextrin (EDA-β-CD) and 0.55 g of maleic anhydride (MAH), dissolve in 50 mL of N, N-dimethylformamide, and place at a constant temperature of 40° C. for reaction for 5 hours. After the reaction is completed, the reaction solution is cooled to room temperature and the product is precipitated with chloroform. The mixture is thoroughly washed with a mixed solution of acetone and distilled water (volume ratio of 10:1), then dried under vacuum at 50° C. to obtain maleic anhydride modified mono 6-ethylenediamine β-cyclodextrin (MAH-EDA-β-CD).

Weigh 10 g of acrylamide (AM), 2.5 g of acrylic acid (AA), 0.05 g of maleic anhydride modified mono 6-ethylenediamine β-cyclodextrin (MAH-EDA-β-CD), and 0.1 g of N-phenethylmaleamic acid (PEMA), and add distilled water to stir, adjust the pH of the solution to 7, then add a certain amount of distilled water, to make the solution mass at 50 g, stir until the solution is clear and transparent; introduce nitrogen for 15 minutes to remove the dissolved oxygen in the water; add a photoinitiator AIBA (0.16 wt % of the total mass of the monomer), and place to a photo-initiating device to react 4 hours.

Embodiment 2

The synthesis of maleic anhydride modified mono 6-ethylenediamine β-cyclodextrin, N-phenethylmaleamic acid is carried out according to the procedures same as those in Embodiment 1.

Weigh 10 g of acrylamide, 2.5 g of acrylic acid, 0.1 g of maleic anhydride modified mono 6-ethylenediamine β-cyclodextrin and 0.2 g of N-phenethylmaleamic acid, add distilled water to stir, adjust the pH of the solution to 7, then add a certain amount of distilled water, to make the solution mass at 50 g, stir until the solution is clear and transparent; introduce nitrogen for 15 minutes to remove the dissolved oxygen in the water; add a photoinitiator AIBA (0.2 wt % of the total mass of the monomer), and place to a photo-initiating device to react 4 hours.

Embodiment 3

The synthesis of maleic anhydride modified mono 6-ethylenediamine β-cyclodextrin, N-phenethylmaleamic acid is carried out according to the procedures same as those in Embodiment 1.

Weigh 10 g of acrylamide, 2.5 g of acrylic acid, 0.05 g of maleic anhydride modified mono 6-ethylenediamine β-cyclodextrin and 0.1 g of N-phenethylmaleamic acid, add distilled water to stir, adjust the pH of the solution to 7-8, then add a certain amount of distilled water, to make the solution mass at 50 g, stir until the solution is clear and transparent; introduce nitrogen for 15 minutes to remove the dissolved oxygen in the water; add a photoinitiator 2-hydroxy-4'-(2-hydroxyethoxy)-2-methylphenylacetone (0.16 wt % of the total mass of the monomer), and place to a photo-initiating device to react 4 hours.

Embodiment 4

The synthesis of maleic anhydride modified mono 6-ethylenediamine β-cyclodextrin, N-phenethylmaleamic acid is carried out according to the procedures same as those in Embodiment 1.

Weigh 10 g of acrylamide, 2.5 g of acrylic acid, 0.1 g of maleic anhydride modified mono 6-ethylenediamine β-cyclodextrin and 0.2 g of N-phenethylmaleamic acid, add distilled water to stir, adjust the pH of the solution to 7, then add a certain amount of distilled water, to make the solution mass at 50 g, stir until the solution is clear and transparent; introduce nitrogen for 15 minutes to remove the dissolved oxygen in the water; add a photoinitiator 2-hydroxy-4'-(2-hydroxyethoxy)-2-methylphenylacetone (0.16 wt % of the total mass of the monomer), and place to a photo-initiating device to react 4 hours.

II. Performance analysis of quadripolymer based on host-guest interaction (taking the samples prepared in the Embodiment 1 as an example)

1. Structural analysis:

FIG. 1 shows the NMR spectrum of N-phenethylmaleamic acid. The corresponding chemical shift of the spectrum is as follows: 2.92 (t, 2H), —CH2-ph; 3.59-3.74 (m, 2H), —NH—CH2-; 6.25 (d, 1H), —CH=CH—COOH; 6.45 (d, 1H), —CH=CH—COOH; 7.11-7.41 (m, 5H), H-Ph; 8.11 (t, 1H), CO—NH—. The NMR spectrum shows that the synthesized product is N-phenethylmaleamic acid.

Figure 2:
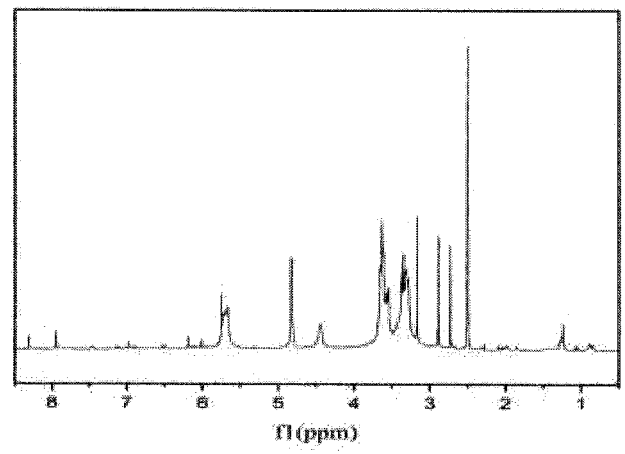
FIG. 2 shows the NMR spectrum of maleic anhydride modified mono 6-ethylenediamine β-cyclodextrin.

FIG. 2 shows the NMR spectrum of maleic anhydride modified mono 6-ethylenediamine β-cyclodextrin. The corresponding chemical shift of the spectrum is as follows: 2.73 (s, 2H), 7-H; 2.89 (s, 2H), 8-H; 3.25-3.42 (m, 14H), 2-H, 4-H; 3.50-3.73 (m, 28H), 3-H, 5-H, 6-H; 4.45 (s, 7H), 1-H; 4.83 (d, 8H), 6-OH; 5.62-5.80 (m, 14H), 2-OH, 3-OH; 6.15-6.2 (d, 1H), —CH=CH—COOH; 6.40-6.60 (d, 1H), —CH=CH—COOH. The NMR spectrum shows that the synthesized product is maleic anhydride modified mono 6-ethylenediamine β-cyclodextrin.

Figure 3:
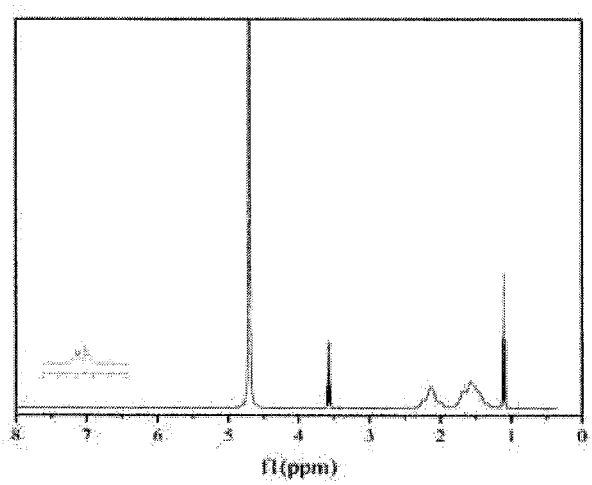
FIG. 3 shows the NMR spectrum of quadripolymer.

FIG. 3 is the NMR spectrum of quadripolymer. 1.54-1.60 indicate the signal peak of methylene (—CH2-) on the polymer main chain and N-phenethylmaleamic acid; 2.10-2.16 indicate the signal peak of the methine (—CH—) on the polymer main chain; 3.52-3.63 indicate the signal peak of methylene and methine on β-CD; 7.10-7.40 indicate the signal peak of benzene ring on N-phenethylmaleamic acid.

2. Analysis of tackifying effect

In order to understand the solution performance of quadripolymer, comb polymer KYPAM (average molecular weight of 16 million) and samples prepared in Embodiment 1 are used for performance evaluation research. KYPAM is produced by Beijing Hengju Oilfield Chemical Agent Co., Ltd. It has been applied to polymer flooding, ternary composite flooding and in-depth profile control and flooding in oilfields such as Daqing, Shengli, North China and Xinjiang, etc, and even at abroad. It is a new generation of highly efficient oil displacement agents with excellent performance that are widely used.

The polymers are prepared into solutions of different concentrations. Under the condition of room temperature and a shear rate of 7.34 $s^{-1}$, the viscosity-concentration curve of the polymers is measured (FIG. 4).

Figure 4:
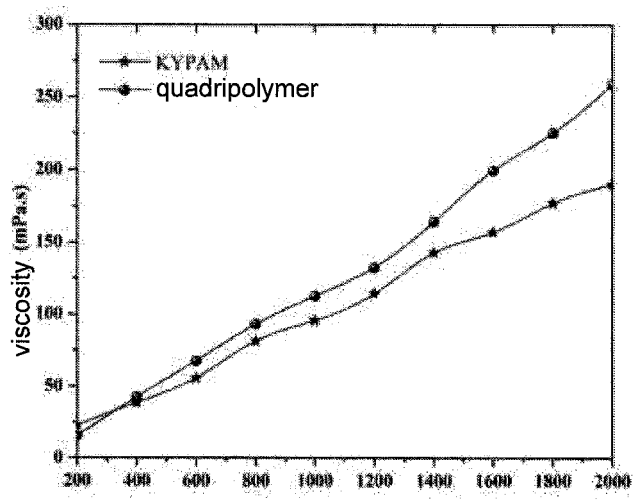
FIG. 4 shows a polymer viscosity-concentration curve.

As shown from FIG. 4, when the polymer concentration is low (200 mg/L), the viscosity of quadripolymer is lower than KYPAM; as the polymer concentration increases, the viscosity of quadripolymer exceeds KYPAM, and the larger the polymer concentration, the bigger the viscosity difference.

3. Temperature resistance analysis

The polymer is prepared into a polymer solution with a concentration of 2000 mg/L. The viscosity-temperature curve of the polymer solution is measured at a shear rate of 7.34 $s^{-1}$ (FIG. 5).

Figure 5:
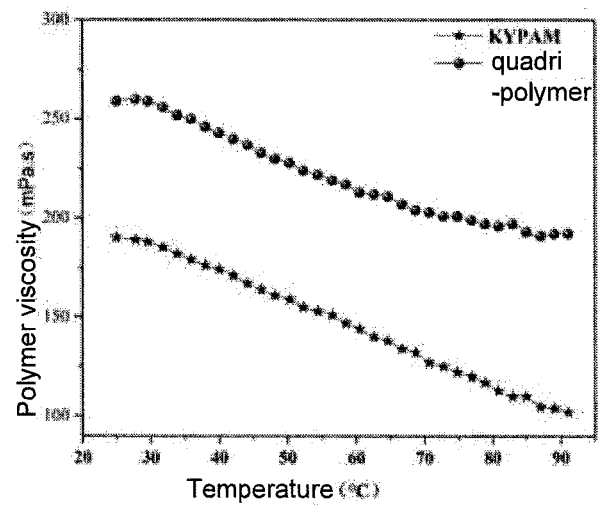
FIG. 5 shows a polymer viscosity-temperature curve.

As shown from FIG. 5, as the temperature increases, the viscosity of the polymer decreases, but the temperature resistance of quadripolymer is significantly stronger, and the viscosity retention rate is still greater than 74% even at a temperature of 90° C.

4. Salt sensitivity analysis

The polymer is prepared into a polymer solution with a concentration of 2000 mg/L under different mineralization degrees. The viscosity-degree of mineralization relationship curve is measured at a room temperature and a shear rate of 7.34 $s^{-1}$ (FIG. 6 and FIG. 7).

Figure 6:
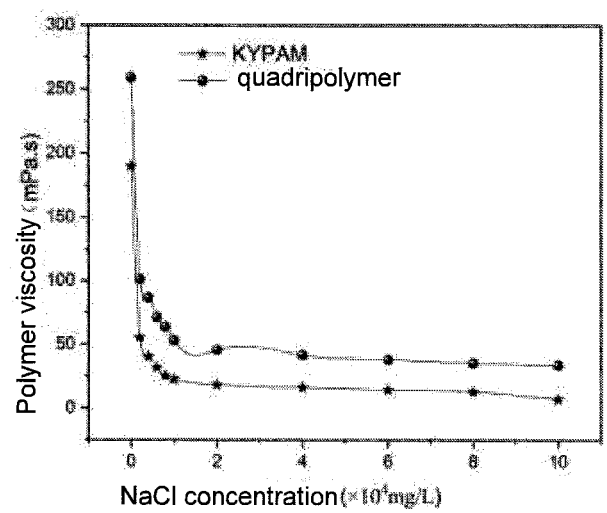
FIG. 6 shows a polymer viscosity-NaCl concentration relationship curve.
Figure 7:
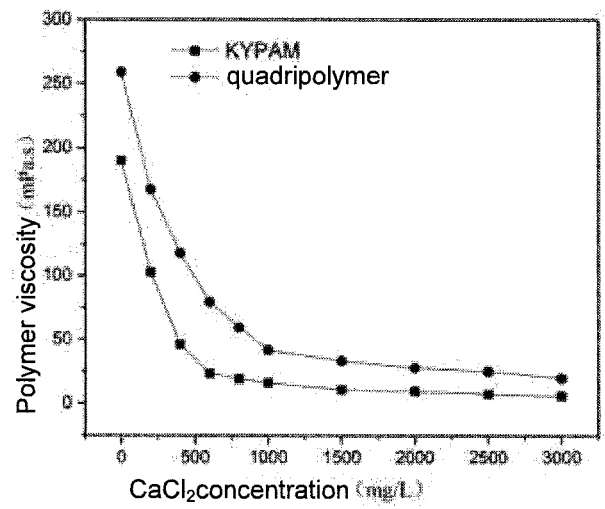
FIG. 7 shows a polymer viscosity-CaCl2 concentration relationship curve.

As shown from FIG. 6 and FIG. 7, the apparent viscosity of the polymer gradually decreases with the increase of degree of mineralization, and the retention rate of quadripolymer viscosity remains above 19% under the high degree of mineralization of $10 \times 10^4$ mg/L NaCl (KYPAM viscosity retention rate is about 3.7%). Under the condition of 3000 mg/L CaCl2 high divalent ion, the quadripolymer viscosity retention rate is maintained above 7% (KYPAM viscosity retention rate is about 3.1%), presenting a good salt resistance performance.

5. Shear resistance analysis

Figure 8:
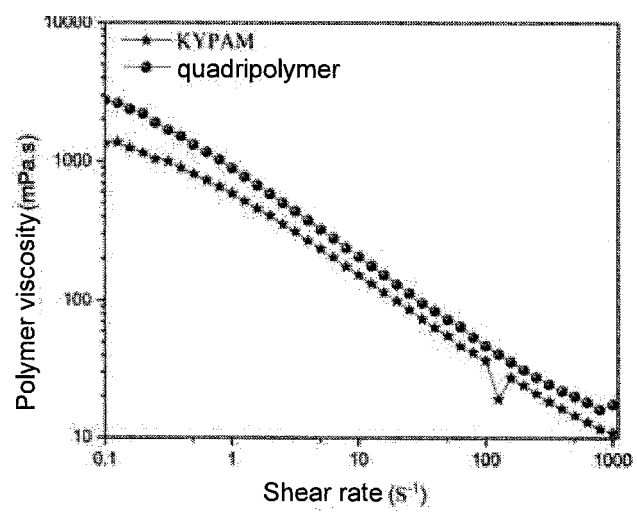
FIG. 8 shows a polymer viscosity-shear rate relationship curve.

The polymer is prepared into a polymer solution of 2000 mg/L under different degrees of mineralization, the viscosity-shear rate relationship curve of the polymer solution is measured at a room temperature and a shear rate of 1-1000 $s^{-1}$ (FIG. 8).

As shown in FIG. 8, as the shear rate increases, the polymer viscosity decreases, but the viscosity of quadripolymer is always higher than the viscosity of KYPAM. At a high shear rate of 1000 $s^{-1}$, the viscosity of quadripolymer is still about 1.6 times of that of KYPAM, showing a better shear resistance than KYPAM.

The above description is only the preferred embodiments of the present invention and is not intended to limit the present invention. Any modification, equivalent replacement, and improvement made within the spirit and principle of the present invention shall fall into the scope of protection of the present invention.

The invention claimed is:

1. A quadripolymer based on host-guest interaction, having the following structural formula:

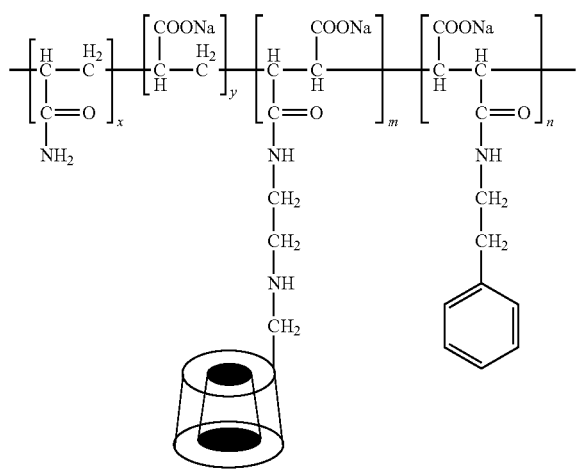

where, x, y, m, and n are the polymerization degrees of monomers, x is 70 to 80%, y is 15 to 25%, n is 0.01 to 0.5%, and m=1−x−y−n, wherein  is a β-cyclodextrin unit.

2. A process for preparing the quadripolymer based on host-guest interaction according to claim 1, comprising the following steps in sequence:

(1) synthesis of N-phenethylmaleamic acid:
weigh maleic anhydride and dissolve it in dichloromethane; slowly add an equimolar amount of β-phenethylamine to the maleic anhydride solution dropwise; stir to react for 1 to 3 hours; after the reaction, perform extraction filtration to get a white solid, which is washed with anhydrous ether and dried under vacuum at 50° C. to obtain N-phenethylmaleamic acid;

(2) synthesis of maleic anhydride modified mono 6-ethylenediamine β-cyclodextrin:
weigh mono 6-ethylenediamine β-cyclodextrin and maleic anhydride at a molar ratio of 1:1.1-1:1.3, dissolve in N, N-dimethylformamide, and place at a constant temperature of 40° C. for 3 to 6 hours to react 6-ethylenediamine β-cyclodextrin and maleic anhydride, wherein after the reaction is completed, the reaction solution is cooled to room temperature and obtained product is precipitated with chloroform, obtained precipitate is washed with a mixed solution of acetone and distilled water, then dried under vacuum at 50° C. to obtain maleic anhydride modified mono 6-ethylenediamine β-cyclodextrin;

(3) synthesis of quadripolymer based on host-guest interaction:
to a reaction vessel add acrylamide (AM), acrylic acid (AA), maleic anhydride modified mono 6-ethylenediamine β-cyclodextrin (MAH-EDA-β-CD), N-phenethylmaleamic acid (PEMA) in distilled water, of which the AM mass fraction is 15-25%, AA mass fraction is 4-5%, MAH-EDA-β-CD mass fraction is 0.05-0.5%, PEMA mass fraction is 0.2-0.5%; adjust pH of obtained solution to 7; introduce nitrogen to remove dissolved oxygen in the distilled water; add a photoinitiator and place the reaction vessel in a photo-initiating device to react for 3-5 hours at a temperature of 10-30° C., to obtain a quadripolymer based on host-guest interaction.

3. The process for preparing the quadripolymer based on host-guest interaction according to claim 2, wherein the photoinitiator is AMA or 2-hydroxy-4'-(2-hydroxyethoxy)-2-methylphenylacetone.

* * * * *